United States Patent
Nichols et al.

(10) Patent No.: US 7,171,518 B2
(45) Date of Patent: Jan. 30, 2007

(54) DATA STORAGE SYSTEM RECOVERY FROM DISK FAILURE DURING SYSTEM OFF-LINE CONDITION

(75) Inventors: Charles E. Nichols, Wichita, KS (US); William A. Hetrick, Wichita, KS (US); Donald R. Humlicek, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 335 days.

(21) Appl. No.: 10/817,302

(22) Filed: Apr. 2, 2004

(65) Prior Publication Data

US 2005/0228942 A1    Oct. 13, 2005

(51) Int. Cl.
*G06F 12/16* (2006.01)
(52) U.S. Cl. ...................... 711/114; 711/162
(58) Field of Classification Search ............... 711/114, 711/130, 161, 162; 714/5, 7, 20, 22
See application file for complete search history.

(56) References Cited

U.S. PATENT DOCUMENTS

| | | | | | |
|---|---|---|---|---|---|
| 4,523,206 | A | * | 6/1985 | Sasscer ........................ | 711/130 |
| 5,341,493 | A | * | 8/1994 | Yanai et al. ................. | 711/161 |
| 5,418,925 | A | * | 5/1995 | DeMoss et al. ............. | 711/114 |
| 5,574,851 | A | * | 11/1996 | Rathunde ........................ | 714/7 |
| 5,586,248 | A | * | 12/1996 | Alexander et al. ............ | 714/22 |
| 5,774,643 | A | * | 6/1998 | Lubbers et al. ................ | 714/20 |
| 5,787,242 | A | * | 7/1998 | DeKoning et al. ............. | 714/5 |
| 5,809,224 | A | * | 9/1998 | Schultz et al. ................. | 714/7 |
| 6,058,489 | A | * | 5/2000 | Schultz et al. ................. | 714/7 |
| 6,223,300 | B1 | * | 4/2001 | Gotoh ........................... | 714/5 |
| 6,907,504 | B2 | * | 6/2005 | Burton et al. ............... | 711/162 |

* cited by examiner

*Primary Examiner*—Pierre Bataille
*Assistant Examiner*—Paul Schlie
(74) *Attorney, Agent, or Firm*—Cochran Freund & Young, LLC

(57) ABSTRACT

A method for returning a logical volume which is part of a redundant data storage system to on-line status following a disk failure within the logical volume during the time when another of that volume's disks is unavailable as a result of having its firmware updated, as an example. Data which would otherwise be changed in the logical volume due to host write requests is directed to a logging facility within the data storage system, but outside of the logical volume undergoing upgrade.

14 Claims, 3 Drawing Sheets

DATA STORAGE SYSTEM RECOVERY FROM DISK FAILURE DURING SYSTEM OFF-LINE CONDITION

CROSS REFERENCE TO RELATED APPLICATIONS

The present patent application hereby incorporates by reference herein the entire contents of U.S. patent application Ser. No. 10/660,888 for "Storage Recovery Using a Delta Log,", by Charles Nichols et al. which was filed on Sep. 12, 2003, for all this patent application teaches and discloses.

FIELD OF THE INVENTION

The present invention relates generally to redundant data storage systems and, more particularly, to the restoration of the availability and the consistency of logical volume data following an unrelated disk failure which occurs during temporary off-line status of a chosen disk in the volume.

BACKGROUND OF THE INVENTION

Upgrading disk drive firmware for devices that are part of a RAID subsystem is often a costly and time-consuming process. During the firmware upgrade process, which may take up to one minute, disk drives are generally unable to respond to other I/O requests, rendering the device unusable to all system (including host-based) I/O. One approach to maintaining data availability during a firmware download is to place the device being upgraded into an unusable state within the logical volume; that is, to induce a degraded mode of operation. During the upgrade process, the changed data for the affected drive is first logged to a repository within the system. Following the firmware upgrade, the data that has been changed during the upgrade is copied from the repository to the drive that was upgraded.

If an unrelated drive within the same logical volume fails while the original drive is having its firmware upgraded, the volume data is no longer available. The logical volume is left in an off-line state, and the user must intervene in some fashion in order to reestablish data availability. Moreover, for volumes configured with redundancy, there is no guarantee that data and its associated redundant data are valid and consistent once recovery has been completed.

Existing solutions to this problem include: (1) preventing system input/output (I/O) during drive firmware upgrades; and (2) copying all data from the drive to be upgraded to a stand-by, spare drive in the system before the download is begun. The stand-by then serves as a replacement for the original drive during the firmware download. The affected volume is still optimal and thus its data is protected from a single drive failure. At this point, the desired drive can have its firmware upgraded without affecting data availability on the original volume. Once the upgrade is complete, data can be copied from the stand-by replacement to the original drive. When the copy is complete, the upgraded drive can be re-integrated into the original volume.

The first solution suffers from the fact that it requires that the storage system be taken off-line from the server's perspective. For customers that require continuous uptime, this solution is unacceptable. The second approach requires all of the data on the affected drive(s) to be copied twice; first to the stand-by spare drive, and subsequently to the original drive. For large-capacity drives, such copy processes can be time-consuming.

Accordingly, it is an object of the present invention to provide a method for recovering from an unrelated disk failure within a logical volume during the period in which another of the volume's disks is temporarily unavailable.

Another object of the invention is to provide a method for recovering from an unrelated disk failure within a logical volume during the period in which another of the volume's disks is in the process of having its firmware updated.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method for temporarily placing a data storage unit within a redundant data storage system having a plurality of data storage units disposed in at least one logical volume in an off-line condition, includes: placing a selected data storage unit in an off-line condition for a period of time; storing data directed to the logical volume in which the selected data storage unit is disposed in a logging repository disposed outside of the logical volume during the period of time; detecting a failure in a data storage unit other than the selected data storage unit in the logical volume; placing the selected data storage unit in an on-line condition following the period of time; downloading data stored in the logging repository onto the selected data storage unit; allowing data directed to the logical volume in which the selected data storage unit is disposed to be stored in the logical volume; and updating redundant data within the logical volume.

Benefits and advantages of the present invention include allowing a logical volume that becomes unavailable for receiving and writing data as a result of an unrelated drive failure in that logical volume during a drive firmware download or another temporary event, to revert to an available state once the download has been completed or the other temporary event has been addressed.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
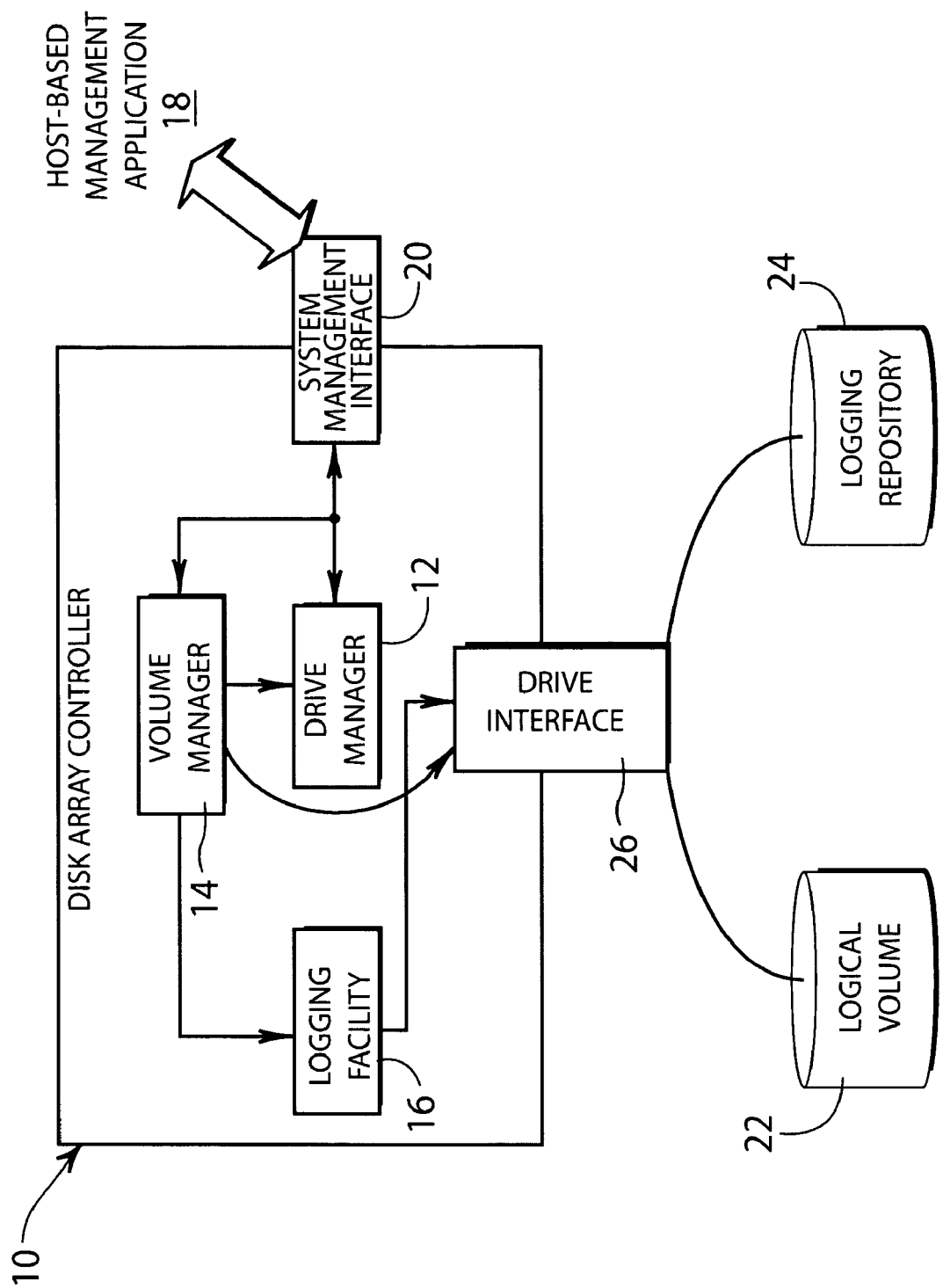
FIG. 1 is a schematic representation of one embodiment of an apparatus useful for practicing the present the invention.

Briefly, the present invention includes a method and apparatus for restoring a logical volume which is part of a redundant data storage system to on-line status as a result of a disk failure within the logical volume during the time when another of that volume's disks is unavailable as a result of having been temporarily taken out of service to perform a firmware upgrade, as an example. During the upgrade process, data that would otherwise be changed in the logical volume due to host write requests is directed to a logging facility within the storage system, but outside of the logical volume undergoing upgrade. After the upgraded disk is again placed in service data stored on the logging facility is downloaded to this disk, and further write requests can be handled by the redundant data storage system, even though another disk has failed.

The invention finds use in computer storage systems having dual, independent RAID storage controllers and a number of disk drives that are part of logical volumes supporting data redundancy. RAID levels 1, 3, and 5 are examples of logical volumes supporting data redundancy, and permit host access to all user data in a logical volume when a single drive is removed or placed in an out-of-service condition within that logical volume (degraded mode). When such an event occurs, the storage controllers present a set of logical volumes, which include one or more of the physical disk devices, to the host system. Read requests directed to an out-of-service drive can have their data reconstructed from redundant data on the other drives in the volume, while write requests directed to the out-of-service drive can be satisfied by updating the appropriate redundant data elsewhere within the volume.

When a second, unrelated drive (a drive other than the selected drive, but within the same logical volume) fails during the period when the selected drive is in an out-of-service condition, the volume is placed in an off-line state. In accordance with the present invention, whatever procedure is to be undertaken relative to the selected drive is completed, while during this time, write requests are accommodated by a logging facility outside of the affected logical volume. Once the selected drive is ready for operation, the logged write data is copied to the first drive (also while the volume is still off-line), and the logical volume is again restored to an on-line, albeit degraded, state. This process is automatically achieved by the volume/drive manager components of the system without user interaction other than for selecting the drive which is to be temporarily taken off-line.

It should be mentioned that during the period when data on the logging facility is downloaded onto the selected disk, write requests have to be managed such that they are directed to the appropriate location. This can be accomplished by allowing write requests occurring in the portion of the drive that has been recovered to be routed directly to the logical volume, while writes addressed to unrecovered regions would be directed to the logging facility. Another procedure would involve establishing a map or table of data blocks contained in the logging facility, such that new data write requests which overlap with the logged data would be invalidated and the write request would be targeted directly to the logical volume.

The volume state being presented to host I/O requests is distinguished from the internal volume state required to complete the download process. From an external perspective, the volume is off-line and inaccessible to all read/write I/O. Within the storage array, however, individual disks within the volume are still available to service download and repository (the logging facility used to hold the changed data) copy requests. Host I/Os can be successfully serviced at this point. Additionally, because all changed data relating to the upgraded drive was logged during the off-line processing, the volume data, and its associated redundant data, is still valid and consistent.

Thus, whatever procedure is to be undertaken relative to a selected drive is completed is continued even when its associated logical volume has been placed off-line due to a second drive failure, and the log facility containing the changed data associated with that drive is still available while the logical volume is off-line. Once the drive processing has been completed, the changed data from the log is re-written to the upgraded drive, and the volume can be returned to an on-line state.

The present invention is applicable to any situation where it is known that a given disk will be temporarily off-line by reason of a transient disk failure, diagnostic tests, or a firmware upgrade as examples.

Reference will now be made in detail to the present preferred embodiments of the invention, examples of which are illustrated in the accompanying drawings. Turning now to FIG. 1, shown is a schematic representation of one embodiment of the apparatus of the present invention. Disk array controller, 10, which includes drive manager, 12, selects the drive for firmware downloading. Volume manager, 14, in cooperation with the drive manager 12 directs state changes in the volume, and cooperates with logging facility, 16, to ensure that the appropriate data is logged and retrieved from the log. The process is directed by a user from host-based, external management application, 18, through the controller's system management interface, 20. Logical volume, 22, and logging repository, 24, are controlled by disk array controller 10 through drive interface, 26.

Figure 2:
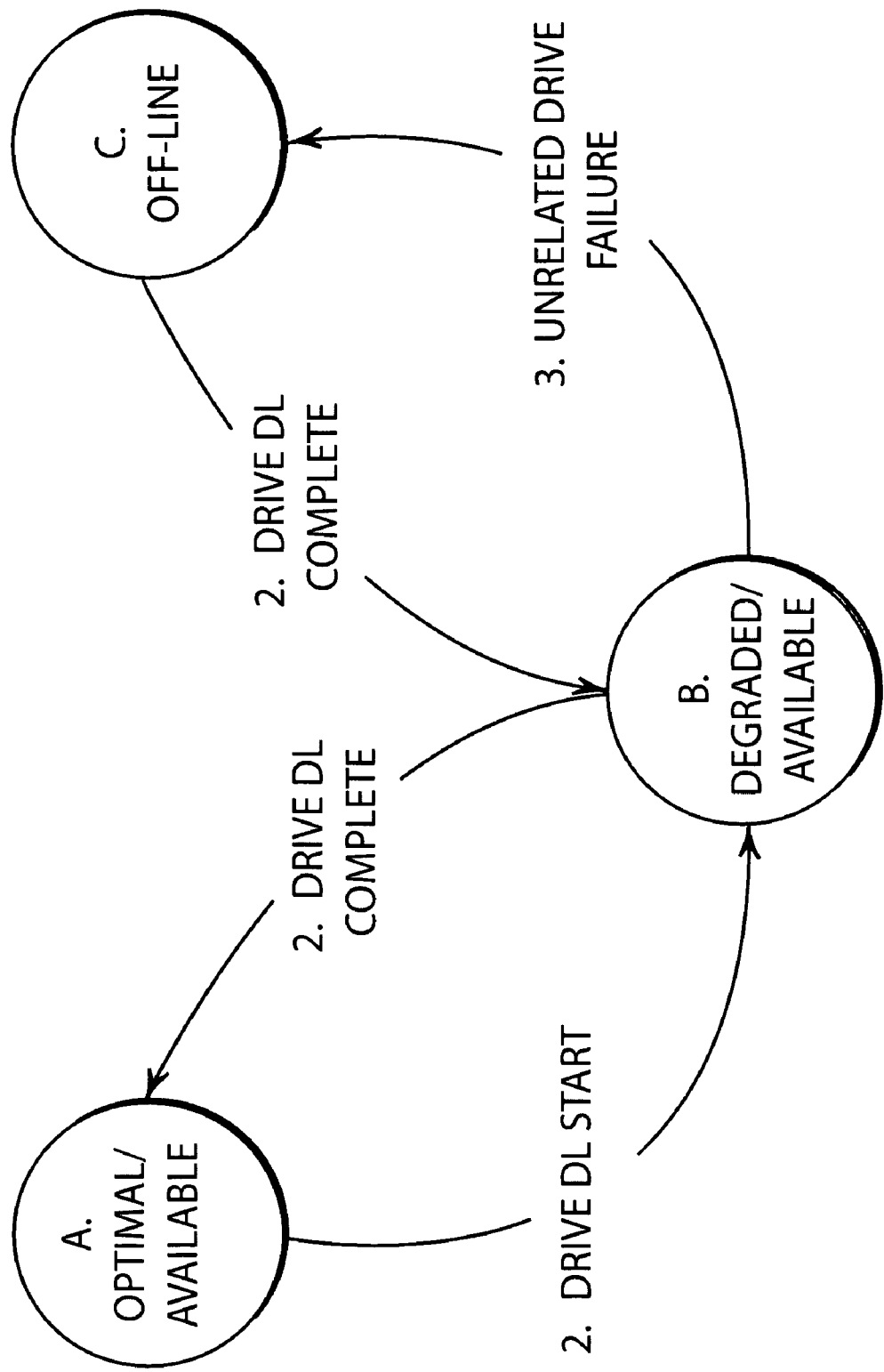
FIG. 2 is a schematic representation illustrating the states of a logical volume from a perspective external to the storage system in which a selected disk drive is to be temporarily taken off-line.

FIG. 2 is a schematic representation of the states of a targeted logical volume from a perspective external to the system, where one of the disk drives is about to have its firmware updated, as an example. State A describes an optimal volume with no failed drives, whereby all data is available to the host computer system. Target volume 22 (See FIG. 1 hereof begins in state A and moves to state B when the drive firmware download is initiated (event #1). In this state, the volume data is still completely available; however, the drive being upgraded is treated as having failed and the volume is in a degraded state. Upon completion of the firmware download, the volume reverts to state A (event #2).

If, however, a drive within the target volume other than the drive undergoing the firmware download fails, the volume moves to state C (event #3). In this state, all volume data is unavailable; however, the drive firmware download is allowed to continue. Once the drive firmware download is completed, the volume automatically becomes available to host I/O requests, albeit in state B, degraded mode (event #3).

Figure 3:
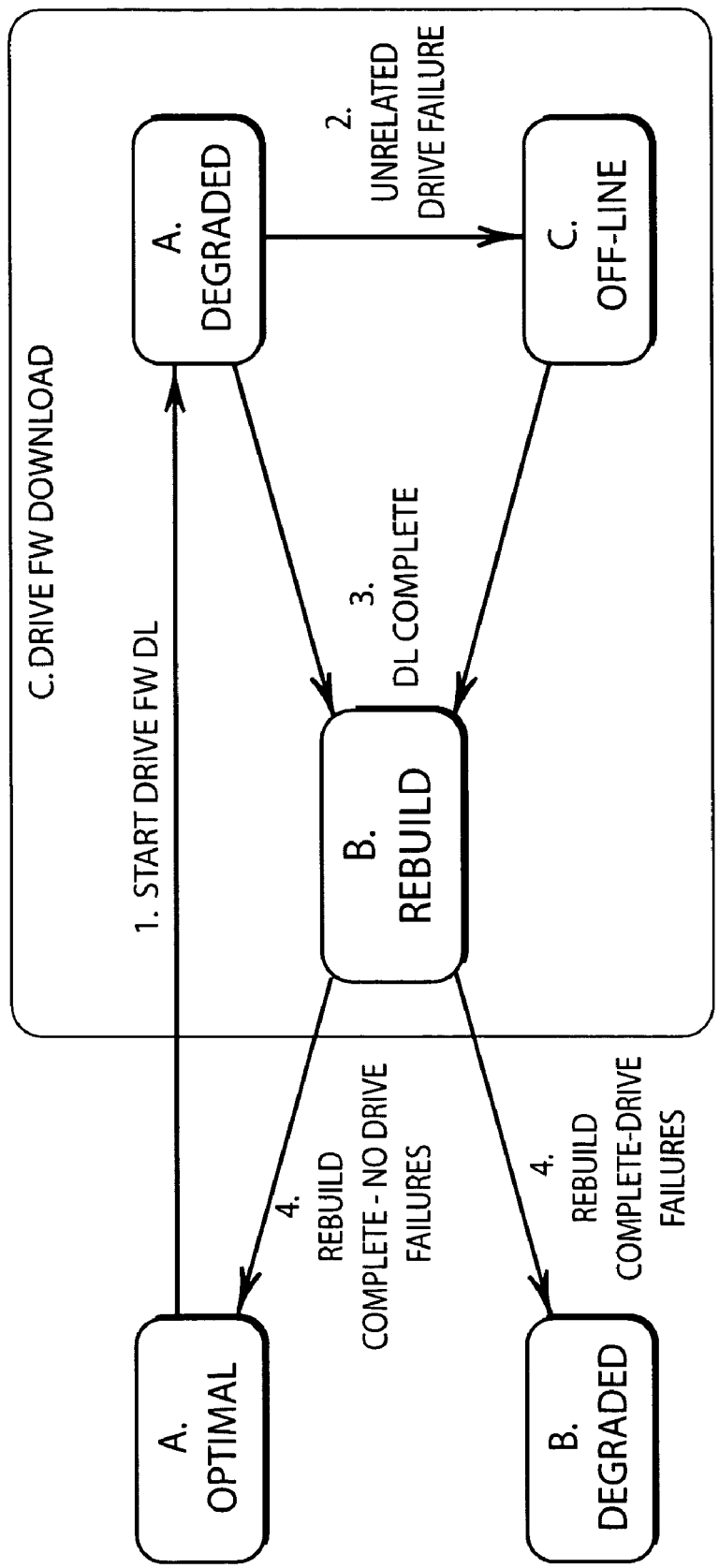
FIG. 3 is a schematic representation illustrating of the state of a logical volume as managed within the storage system.

FIG. 3 is a schematic representation of the states of a logical volume as managed from within the storage system. The volume begins as optimal (state A), and upon commencement of the firmware download, transitions (event #1) into a Downloading/Degraded State (state C/A). State C, Drive FW Download, represents a volume super-state that can have one or more sub-states associated with it. The sub-states are referred to as Super/Sub states; for example, C/A represents a volume in the Drive FW Download/Degraded state. In this state, the RAID controller will record writes directed to the downloading drive volume to an internal logging facility.

Clearly, the internal logging apparatus can take many forms, one such apparatus being the delta log apparatus described in U.S. patent application Ser. No. 10/660,888 for "Storage Recovery Using a Delta Log." Read requests directed to the downloading drive will be treated as degraded and will have their data reconstructed from redundant information within the logical volume. Once the download is completed (event #3), the volume is automatically moved to state C/B, wherein the data logged for the downloading drive is written to the appropriate location on that drive. Once the process of moving the data from the logging facility back to the correct drive is complete (event #4), the volume returns to state A.

If, however, a drive other than the downloading drive fails while the volume is in state C/A, the volume will transition to an off-line state, C/C. In this state, the download will be continued to the selected drive, but all volume data will be temporarily unavailable to all host computers. Once the download is completed (event #3), the RAID controller transitions to state C/B and any data logged while the system is in state C/A is copied to the appropriate location on the drive that was upgraded (received a firmware download). Once the rebuild process is complete (event #4), the volume data again becomes available, albeit in state B, which is a degraded mode.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for temporarily placing a data storage unit in an off-line condition within a redundant data storage system having a plurality of data storage units disposed in at least one logical volume in an on-line condition, which comprises the steps of:
    placing a selected data storage unit in an off-line condition for a purpose unrelated to a failure thereof for a period of time;
    automatically storing data directed to the logical volume in which the selected data storage unit is disposed in a logging repository disposed outside of the logical volume in which the selected data storage unit is disposed during the period of time;
    detecting a failure in a data storage unit other than the selected data storage unit in the logical volume in which the selected data storage unit is disposed;
    placing the selected data storage unit in an on-line condition following the period of time;
    downloading data stored in the logging repository onto the selected data storage unit;
    allowing data directed to the logical volume in which the selected data storage unit is disposed to be stored in the logical volume in which the selected data storage unit is disposed; and
    updating redundant data within the logical volume in which the selected data storage unit is disposed.

2. The method of claim 1, wherein the selected data storage unit is placed in an off-line condition for a period of time for the purpose selected from the group consisting of updating firmware, diagnostic tests, unit replacement, and unit reset.

3. The method of claim 1, wherein the redundant data storage system is selected from the group consisting of RAID 1, RAID 3 and RAID 5.

4. The method of claim 1, wherein the logical volume comprises a plurality of disk drives.

5. The method of claim 1, wherein the logging repository comprises a disk drive.

6. The method of claim 1, wherein said step of the storing data directed to the logical volume in which the selected data storage unit is disposed in a logging repository disposed outside of the logical volume in which the selected data storage unit is disposed, and said step of allowing data directed to the logical volume in which the selected data storage unit is disposed to be stored in the logical volume in which the selected data storage unit is disposed are achieved using the volume/drive manager of said redundant data storage system.

7. A method for updating firmware in a selected data storage unit which has not failed in a redundant data storage system having a plurality of data storage units disposed in at least one logical volume which is in an on-line condition, where a second data storage unit in the at least one logical volume in which the selected data storage unit is disposed has failed, comprising:
    downloading firmware onto the selected data storage unit for a purpose unrelated to a failure thereof;
    automatically storing data directed to the at least one logical volume in which the selected data storage unit is disposed in a logging facility outside of the at least one logical volume in which the selected data storage unit is disposed during said step of downloading firmware;
    downloading data stored in the logging facility onto the selected data storage unit following said step of downloading firmware; and
    updating redundant data in the at least one logical volume in which the selected data storage unit is disposed.

8. The method of claim 7, wherein the redundant data storage system is selected from the group consisting of RAID 1, RAID 3 and RAID 5.

9. The method of claim 7, wherein the logical volume comprises a plurality of disk drives.

10. The method of claim 7, wherein the logging facility comprises a data storage unit adapted to store data directed to the logical volume in which the selected data storage unit is disposed during said step of downloading firmware.

11. An apparatus for downloading firmware on a selected data storage unit disposed in a redundant data storage system having a plurality of data storage units disposed in at least one logical volume in an on-line condition, comprising in combination:
    (a) means for downloading firmware onto a selected data storage unit from said plurality of data storage units in said at least one logical volume for a purpose unrelated to a failure thereof;
    (b) a logging facility for automatically storing data directed to said at least one logical volume in which said selected data storage unit is disposed during the firmware download, said logging repository being located outside of said at least one logical volume;

(c) means for detecting a failure in a data storage unit which has not been selected in said at least one logical volume;
(d) means for downloading data stored in said logging facility onto said selected data storage unit; and
(e) means for updating the redundant data in said data storage system.

12. The apparatus of claim 11, wherein said redundant data storage system is selected from the group consisting of RAID 1, RAID 3 and RAID 5.

13. The apparatus of claim 11, wherein said logical volume comprises a plurality of disk drives.

14. The apparatus of claim 11, wherein said logging facility comprises a data storage unit adapted to store data directed to said at least one logical volume in which said selected data storage unit is disposed during the firmware download.

* * * * *